(12) United States Patent
Tapata

(10) Patent No.: US 9,518,599 B2
(45) Date of Patent: Dec. 13, 2016

(54) METAL TO METAL FASTENER

(71) Applicant: SIMPSON STRONG-TIE COMPANY, INC., Pleasanton, CA (US)

(72) Inventor: Neelima Tapata, San Ramon, CA (US)

(73) Assignee: SIMPSON STRONG-TIE COMPANY, INC., Pleasanton, CA (US)

( * ) Notice: Subject to any disclaimer, the term of this patent is extended or adjusted under 35 U.S.C. 154(b) by 0 days.

(21) Appl. No.: 14/249,943

(22) Filed: Apr. 10, 2014

(65) Prior Publication Data

US 2015/0292542 A1 Oct. 15, 2015

(51) Int. Cl.
| | |
|---|---|
| *F16B 25/10* | (2006.01) |
| *F16B 35/04* | (2006.01) |
| *F16B 43/00* | (2006.01) |
| *F16B 23/00* | (2006.01) |
| *F16B 25/00* | (2006.01) |
| *E04D 3/36* | (2006.01) |

(52) U.S. Cl.
CPC ............ *F16B 35/04* (2013.01); *E04D 3/3606* (2013.01); *F16B 23/00* (2013.01); *F16B 25/0021* (2013.01); *F16B 43/00* (2013.01); *F16B 25/0084* (2013.01)

(58) Field of Classification Search
CPC ..................................................... F16B 25/10
USPC ........... 411/378, 387.1, 387.6, 402, 509, 533
See application file for complete search history.

(56) References Cited

U.S. PATENT DOCUMENTS

| | | | | | |
|---|---|---|---|---|---|
| 3,584,667 | A | * | 6/1971 | Reiland | ............................. 81/460 |
| 3,882,756 | A | * | 5/1975 | Sauer et al. | ................ 411/387.1 |
| 4,583,898 | A | * | 4/1986 | Sygnator | .................... 411/387.7 |
| 4,725,175 | A | * | 2/1988 | Jesson | ......................... 411/387.8 |
| 4,787,792 | A | * | 11/1988 | Jesson et al. | .............. 411/387.7 |
| 4,836,730 | A | * | 6/1989 | Jesson et al. | .............. 411/387.6 |

(Continued)

FOREIGN PATENT DOCUMENTS

| | | |
|---|---|---|
| WO | 96/22472 A1 | 7/1996 |
| WO | 2005/05937 A1 | 6/2005 |

(Continued)

OTHER PUBLICATIONS

International Search Report mailed Jun. 17, 2015, in International Appl. No. PCT/US2015/024872 filed Apr. 8, 2015.

(Continued)

*Primary Examiner* — Roberta Delisle
(74) *Attorney, Agent, or Firm* — Vierra Magen Marcus LLP

(57) ABSTRACT

A fastener includes a shank having a diameter including a helical thread and a cutting tip. The fastener includes a head having an integral washer and nut. The washer has a diameter (d) and a thickness (t), wherein a relation of the diameter to the thickness is established through a shape factor greater than 0.55, the shape factor for the thickness (t) greater than 0.06 inches being $d*(1+2.5t)*t^{(t-0.06)}$ and for the thickness (t) less than or equal to 0.06 inches being $d*(1+2.5t)*t^{(0.06-t)}$. The fastener may be used in a system wherein a thin steel element abuts the washer and the fastener joins the thin steel element to a thick steel element.

16 Claims, 6 Drawing Sheets

(56) References Cited

U.S. PATENT DOCUMENTS

| | | | | |
|---|---|---|---|---|
| 4,958,972 | A * | 9/1990 | Shinjo | 411/387.1 |
| 5,186,688 | A * | 2/1993 | Uejima | 470/9 |
| 5,499,896 | A * | 3/1996 | Cafarelli | 411/387.2 |
| 5,520,491 | A * | 5/1996 | Miyagawa | 411/387.8 |
| 5,551,818 | A * | 9/1996 | Koppel | 411/387.1 |
| 6,015,252 | A * | 1/2000 | Peck | 411/387.1 |
| 6,142,719 | A * | 11/2000 | Daubinger et al. | 411/387.8 |
| 6,185,896 | B1 * | 2/2001 | Roberts et al. | 52/537 |
| 8,408,856 | B2 * | 4/2013 | Ernst et al. | 411/387.1 |
| 8,444,360 | B2 * | 5/2013 | Baumgartner et al. | 411/387.8 |
| 2003/0147717 | A1 * | 8/2003 | Koppel et al. | 411/387.1 |
| 2010/0119327 | A1 * | 5/2010 | Lin | 411/387.8 |
| 2010/0226732 | A1 * | 9/2010 | Baumgartner et al. | 411/387.1 |
| 2011/0255936 | A1 * | 10/2011 | Stager et al. | 411/387.1 |

FOREIGN PATENT DOCUMENTS

| | | | |
|---|---|---|---|
| WO | 2011/056538 | A1 | 5/2011 |
| WO | 2013/167451 | A1 | 11/2013 |

OTHER PUBLICATIONS

International Preliminary Report on Patentability and Written Opinion mailed Oct. 20, 2016, in International Appl. No. PCT/US2015/024872 filed Apr. 8, 2015.

* cited by examiner

Figure 4

| Connection Type | Contact Material 1 | Material 2 | Screw Connection Shear (lbs.) | Standard AISI Screw Equation (lbs.) | Percent Increase in Shear (%) |
|---|---|---|---|---|---|
| Shear | 22 ga | 0.375 in (3/8") | 1604 | 756 | 212 |
| Shear | 22 ga | 3 ga (1/4") | 1543 | 756 | 204 |
| Shear | 22 ga | 7 ga (3/16") | 1399 | 756 | 185 |
| Shear | 22 ga | 10 ga (1/8") | 1315 | 756 | 174 |
| Shear | 20 ga | 0.375 in (3/8") | 1941 | 918 | 211 |
| Shear | 20 ga | 3 ga (1/4") | 1863 | 918 | 203 |
| Shear | 20 ga | 7 ga (3/16") | 1670 | 918 | 182 |
| Shear | 20 ga | 10 ga (1/8") | 1622 | 918 | 177 |
| Shear | 18 ga | 3 ga (1/4") | 2572 | 1215 | 212 |
| Shear | 18 ga | 7 ga (3/16") | 2396 | 1215 | 197 |
| Shear | 18 ga | 10 ga (1/8") | 2353 | 1215 | 194 |
| Shear | 16 ga | 3 ga (1/4") | 3481 | 1533 | 227 |
| Shear | 16 ga | 7 ga (3/16") | 3473 | 1533 | 227 |
| Shear | 16 ga | 10 ga (1/8") | 2739 | 1533 | 179 |

Figure 5

Highlighted Values Indicate Shape Factor > 0.55

| Test No. | Main Member (in contact with screw head) | Side Member | Washer shape | Washer Thickness, t (in.) | Washer Dia., d (in.) | Shape Factor | Test Ultimate Shear (lbs.) | Percent Increase in Shear (%) |
|---|---|---|---|---|---|---|---|---|
| Calc | | | Standard Screw - Calculated Value | | | | 1060 | 100 |
| 1 | 20 ga | 3 ga | Round washer | 0.042 | 0.415 | 0.4331 | 1274 | 120 |
| 2 | 20 ga | 3 ga | Round washer | 0.05 | 0.5 | 0.5459 | 1337 | 126 |
| 3 | 20 ga | 3 ga | Round - small | 0.048 | 0.625 | 0.6750 | 1834 | 173 |
| 4 | 20 ga | 3 ga | Round washer | 0.06 | 0.5 | 0.5750 | 1494 | 141 |
| 5 | 20 ga | 3 ga | Round - small | 0.06 | 0.625 | 0.7188 | 2086 | 197 |
| 6 | 20 ga | 3 ga | Round-large | 0.06 | 0.75 | 0.8625 | 2201 | 208 |
| 7 | 20 ga | 3 ga | Round washer | 0.075 | 0.5 | 0.5711 | 1565 | 148 |
| 8 | 20 ga | 3 ga | Round washer | 0.075 | 0.625 | 0.7139 | 1717 | 162 |
| 9 | 20 ga | 3 ga | Round washer | 0.1 | 0.5 | 0.5700 | 1444 | 136 |
| 10 | 20 ga | 3 ga | Round washer | 0.1 | 0.625 | 0.7125 | 1783 | 168 |

| Washer Thickness, t (in.) | Washer Dia., d (in.) | Shape Factor | Predicted Shear (lbs.) | Percent Increase in Shear (%) |
|---|---|---|---|---|
| Standard Screw (20 ga- 3 ga) | | | 1060 | 100 |
| 0.036 | 0.375 | 0.3774 | 1057 | 100 |
| 0.036 | 0.415 | 0.4177 | 1155 | 109 |
| 0.036 | 0.5 | 0.5032 | 1359 | 128 |
| 0.036 | 0.625 | 0.6290 | 1653 | 156 |
| 0.036 | 0.75 | 0.7548 | 1939 | 183 |
| 0.042 | 0.375 | 0.3914 | 1091 | 103 |
| 0.042 | 0.415 | 0.4331 | 1192 | 112 |
| 0.042 | 0.5 | 0.5219 | 1403 | 132 |
| 0.042 | 0.625 | 0.6523 | 1706 | 161 |
| 0.042 | 0.75 | 0.7828 | 2001 | 189 |
| 0.05 | 0.375 | 0.4094 | 1135 | 107 |
| 0.05 | 0.415 | 0.4531 | 1240 | 117 |
| 0.05 | 0.5 | 0.5459 | 1460 | 138 |
| 0.05 | 0.625 | 0.6824 | 1775 | 167 |
| 0.05 | 0.75 | 0.8188 | 2082 | 196 |
| 0.06 | 0.375 | 0.4313 | 1188 | 112 |
| 0.06 | 0.415 | 0.4773 | 1298 | 122 |
| 0.06 | 0.5 | 0.5750 | 1528 | 144 |
| 0.06 | 0.625 | 0.7188 | 1857 | 175 |
| 0.06 | 0.75 | 0.8625 | 2179 | 206 |
| 0.075 | 0.375 | 0.4283 | 1181 | 111 |
| 0.075 | 0.415 | 0.4740 | 1290 | 122 |
| 0.075 | 0.5 | 0.5711 | 1519 | 143 |
| 0.075 | 0.625 | 0.7139 | 1846 | 174 |
| 0.075 | 0.75 | 0.8567 | 2166 | 204 |
| 0.09 | 0.375 | 0.4274 | 1178 | 111 |
| 0.09 | 0.415 | 0.4729 | 1288 | 121 |
| 0.09 | 0.5 | 0.5698 | 1516 | 143 |
| 0.09 | 0.625 | 0.7123 | 1843 | 174 |
| 0.09 | 0.75 | 0.8547 | 2161 | 204 |
| 0.105 | 0.375 | 0.4278 | 1179 | 111 |
| 0.105 | 0.415 | 0.4734 | 1289 | 122 |
| 0.105 | 0.5 | 0.5704 | 1517 | 143 |
| 0.105 | 0.625 | 0.7130 | 1844 | 174 |
| 0.105 | 0.75 | 0.8556 | 2163 | 204 |

Highlighted Values Indicate Shape Factor > 0.55

Figure 7

METAL TO METAL FASTENER

BACKGROUND

Fastener designs have been used to improve specific fastener characteristics in different materials. Ultimately, the fastener needs to bind one material to another securely and efficiently. In applications involving, for example, light-gauge metal roof decks where a relatively thin metal material is in contact with a relatively thick material below the thin material. The failure mode in shear connections of lighter gauge material connected to thicker steels is due to the lighter gauge material tearing and rolling and hence the fastener losing bearing, which contributes to a bearing failure. In these connections, the lighter gauge material is adjacent to the fastener head. Typically, bearing failure is the controlling failure mode for larger diameter screws with normal heads and washers.

SUMMARY

Technology is described herein which provides a unique fastener. The fastener includes a shank having a diameter including a helical thread and a cutting tip. The fastener includes a head having an integral washer. The washer has a diameter (d) and a thickness (t), wherein a relation of the diameter to the thickness is established through a shape factor (calculated with both d and t in inches) and where the shape factor is greater than 0.55. The shape factor for a thickness of washer (t) greater than 0.06 inches, shape factor=$d*(1+2.5t)*t^{(t-0.06)}$, and for washer (t) thickness less than or equal to 0.06 inches, shape factor=$d*(1+2.5t)*t^{(0.06-t)}$. The fastener may be used in a system wherein a thin steel element abuts the washer and the fastener joins the thin steel element to a thick steel element.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is a table illustrating test results of the present fastener compared to generic screw equations of expected results.

FIG. 5 is a table illustrating test results of the present fastener for different washer diameters and thicknesses.

FIG. 7 is a table illustrating predicted shear values using the fastener described herein with different washer diameters and thicknesses.

DETAILED DESCRIPTION

The technology described herein is a fastener having features allowing securing elements in steel or other materials and providing improved performance therein. The technology includes a threaded fastener having a shank, a helical thread and a cutting tip. The fastener includes a head having an integral washer. The washer has a diameter (d) and a thickness (t), wherein a relation of the diameter to the thickness is established through a shape factor (calculated with both d and t in inches) and where the shape factor is greater than 0.55. The shape factor is calculated as follows: for a thickness of washer (t) greater than 0.06 inches, shape factor=$d*(1+2.5t)*t^{(t-0.06)}$ and for washer (t) thickness less than or equal to 0.06 inches, shape factor=$d*(1+2.5t)*t^{(0.06-t)}$. The fastener may be used in a system wherein a thin steel element abuts the washer and the fastener joins the thin steel element to a thick steel element.

A first embodiment of the fastener technology will be described with respect to FIGS. 1-3 and 9. The standard designation for a Unified Thread Standard (UTS) thread is a number indicating the nominal (major) diameter of the thread, followed by the pitch measured in threads per inch. Certain dimensions given herein are for a "#12" UTS screw. Other sizes of screws may be created in accordance with the teachings herein and the dimensions given are merely exemplary.

Figure 1:
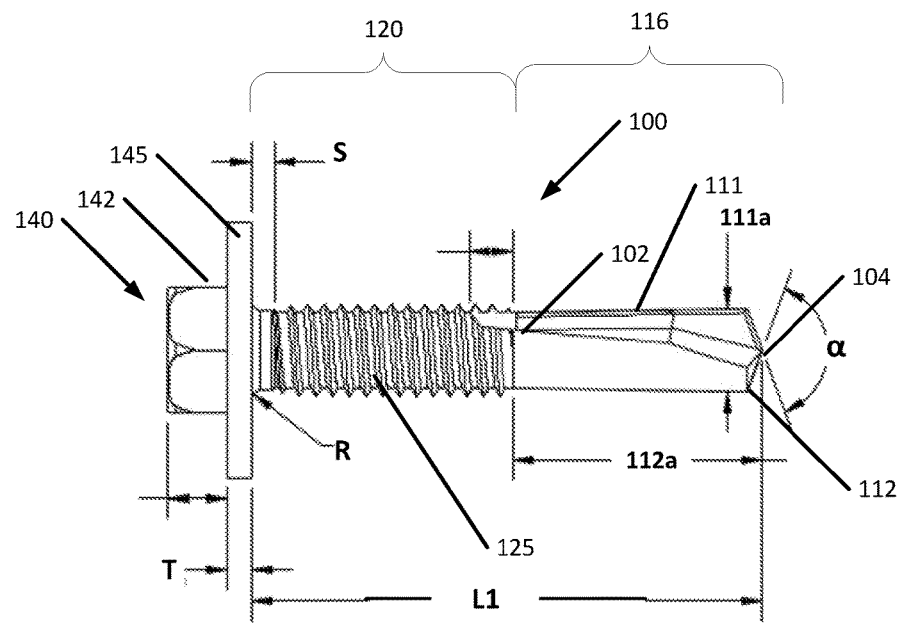
FIG. 1 is a plan view of a first embodiment of a fastener in accordance with the present technology.
Figure 3:
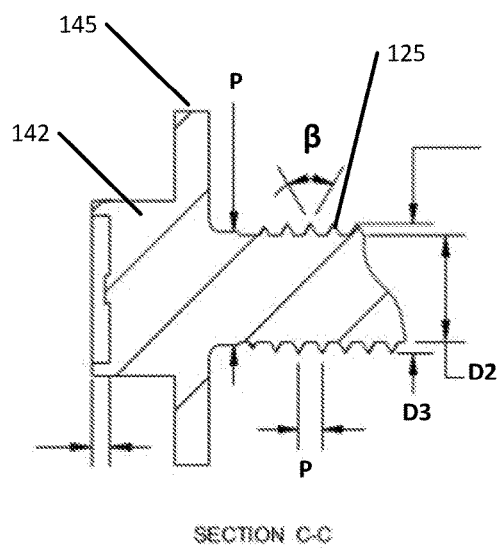
FIG. 3 depicts an enlarged, partial cut-away view of the fastener of FIG. 1.
Figure 2:
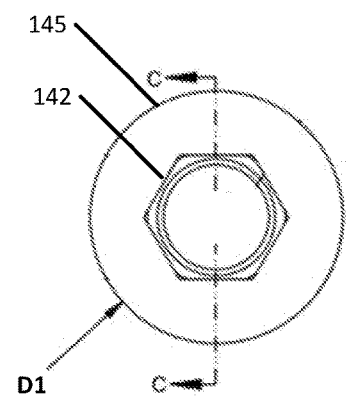
FIG. 2 depicts an end view of the fastener in FIG. 1.

The fastener 100 of FIGS. 1-3 includes a shank 102 having a pointed tip 104 at one end thereof and a head 140 at another end. The shank may be formed of stainless or carbon steel, though other materials may be used. The first section 116 extends from pointed tip 104 to second section 120.

Section 116 forms what is commonly known in the industry as a cutting tip, also referred to by a common manufacturer name as a TEK® point. A cutting tip has two cutting edges 111, 112 extending from the point 104 and formed from a cylindrical cross-section of a shank, defining a cutting tip in section 116. The cutting edges are symmetrical relative to the cross section and allow material borne out by the rotation of the screw to be evacuated as the fastener is rotated into the material. The cutting tip has a point diameter 111a and a length 112a. The point is formed by an angle α of the cutting edges. In one embodiment α is 135-155 degrees and optimally 140 degrees The body of the shank has a minor diameter D2 (FIG. 3) in second section 120. Second section 120 of the shank includes a helical thread 125 formed on the shank 102 extending from head end 140 to the cutting tip. The shank in section 120 has a generally cylindrical shank diameter D2 and the thread has a diameter D3 which is approximately 1.1-1.3 times D2 and optimally 1.22 times D2. The thread 125 has an effective thread height above the shank in the section 120 equivalent to ((D3−D2)/2) and a pitch P of 0.041 inch, resulting in 24 threads per inch (TPI) for a number 12 (#12) size screw.

The thread in section 120 has a thread angle β. In one embodiment β is 55-65 degrees and optimally 60 degrees. The thread angle β may be maintained through section 120.

In various embodiments, the total length L1 of the shank may vary between 1-1.5 inch and optimally 1.25 inches.

Head 140 may be any standard head includes a hex head 142 head formed with an integrated washer 145. Washer 145 has a diameter D1 of 0.5 inch to 1.0 inch, and optimally 0.625 inch, a thickness T of 0.04 inch to 0.1 inch and optimally 0.06 inch, and is joined to the helical thread 125 by a curved radius R (0.020 inch) in a spaced region S having a thickness of 0.043 inch.

Figure 9:
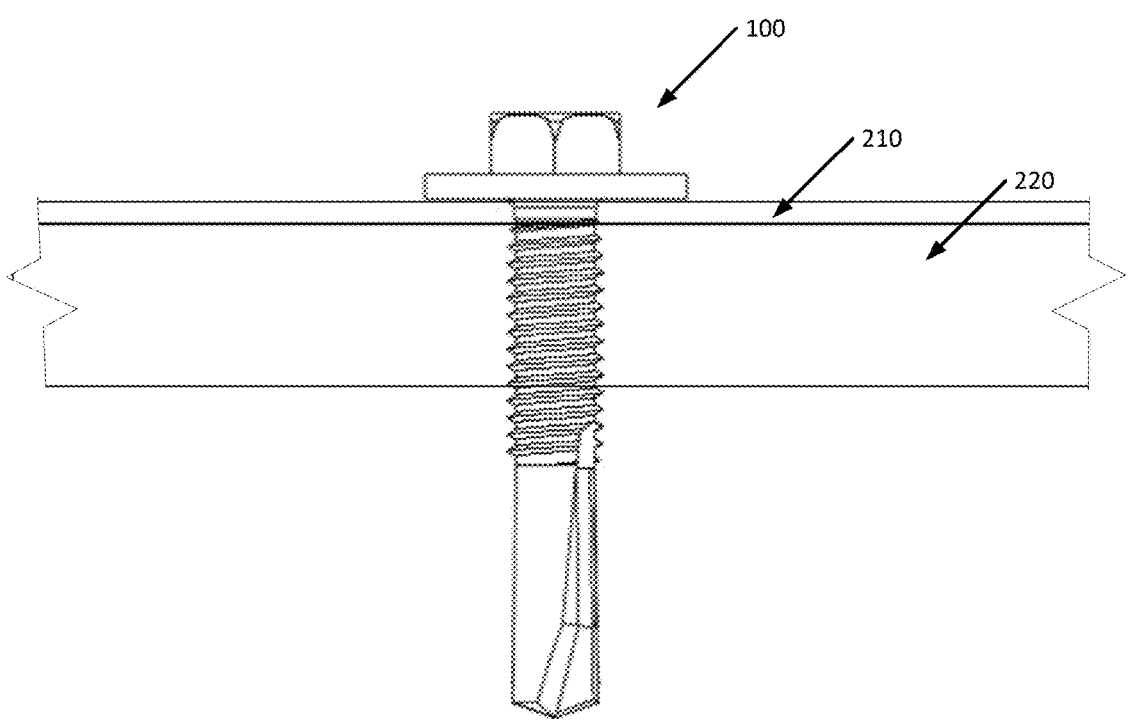
FIG. 9 is a fastening system using the fastener described herein.

The integrated washer 145 and the hex head 142 optimize performance in uplift and shear in applications involving, for example, light-gauge metal roof decks where a relatively thin metal material is in contact with the washer with a relatively thick material below the thin material. The washer thickness T and diameter D1 are designed to produce higher shear and uplift values for the roof deck than other screw products. The fastener is found useful in applications supporting higher uplift in light gauge steel decks connected to thicker support steel. This is useful in high wind regions. FIG. 9 illustrates a fastener 100 embedded in a material fastening a light gauge element 210 to a thicker element 220.

Given the support steel was thick (on the order of 3 gauge in thickness (about 0.24 inch)) and the deck steel is thin (on the order of 20 gauge in thickness (about 0.036 inch)), the uplift design was controlled by pullover of fastener. With single-fastener connection shear tests with this fastener, a significant and unexpected increase in shear loads was observed. It was observed that the net surface area under the washer and the thickness of the washer have both contributed to higher loads in not only uplift but also in shear. The net surface area of the washer is the surface area of the washer minus the cross-sectional area of the screw shank.

The failure mode in shear connections of lighter gauge material connected to thicker steels is due to the lighter gauge material tearing and rolling and hence the fastener losing bearing, which contributes to a bearing failure. In these connections, the lighter gauge material is adjacent to the fastener head. Typically, bearing failure is the controlling failure mode for #12 and larger diameter screws with normal heads and washers. For #10 and smaller diameter screws the shear strength of the screw governs failure. By increasing the area of contact with the enlarged washer on the #12 screws, there was more bearing, which resulted in increased shear. As the area of contact increased, the connection shear increased as long as the shear strength of the screw did not govern. The thickness of the washer also contributed to increase shear up to an optimized thickness after which the increase in washer thickness had no additional effect on shear. The thickness of the washer also contributed to increase pullover to an optimized washer thickness after which additional thickness had no effect on pullover.

FIG. 4 shows test results of the present fastener compared to standard screw equations (Eq. E4.3.1-4 and Eq. E4.3.1-5) specified by AISI S100/North American Specification for the Design of Cold-Formed Steel Structural Members. The table comparison shows that the fastener with the large integral washer produces shear capacity that is nearly twice to more than twice that expected from standard screw products over a range of common deck and support thickness combinations.

A shape factor for the fastener has been found to characterize this effectiveness. The washer diameter to thickness ratio effect on load increase of #12 or higher screws can be characterized as effective where, for a diameter of washer (d) and thickness of washer (t) in inches, a shape factor for washer is greater than 0.55. The shape factor is calculated as follows: for a thickness of washer (t) greater than 0.06 inches, shape factor=$d*(1+2.5t)*t^{(t-0.06)}$ and for washer (t) thickness less than or equal to 0.06 inches, shape factor=$d*(1+2.5t)*t^{(0.06-t)}$. By increasing the area of contact with the enlarged washer on the #12 screws, there was more bearing which resulted in increased shear. The influence of washer diameter (d) and the thickness (t) on connection shear is established through shape factor as shown in FIG. 5. It was observed that the shape factor greater than 0.55 resulted in a high shear increase.

FIG. 5 shows the results of several tests for various sized washer thicknesses and washer diameters. The table is sorted by washer thickness and tests were conducted where the fastener connected a 20 gauge steel plate in contact with the washer (screw head) and a 3 gauge plate in contact with the 20 gauge plate.

As illustrated therein at test 10 for a washer of diameter 0.625 inch and thickness of 0.1 inch, failure occurred a shear of 1783 lbs. For the same diameter washer at thicknesses of 0.075 inch, the failure was nearly the same at 1717 lbs (test 8) and at a thickness of 0.060 inch (test 5), the failure shear increased to 2086 lbs. However, for a thinner washer thickness of 0.048 inch, the shear was 1834 lbs. This relation holds true with respect to test on a half inch diameter washer (tests 9, 7, 4, and 2) where thicknesses of 0.1 inch, 0.075 inch, 0.060 inch and 0.48 inch resulted in the highest shear at a washer thickness of 0.075 inch. Test 6 shows that increasing the diameter of the washer relative to the same washer thickness (versus test 5) also provides an increase in shear.

Figure 6:
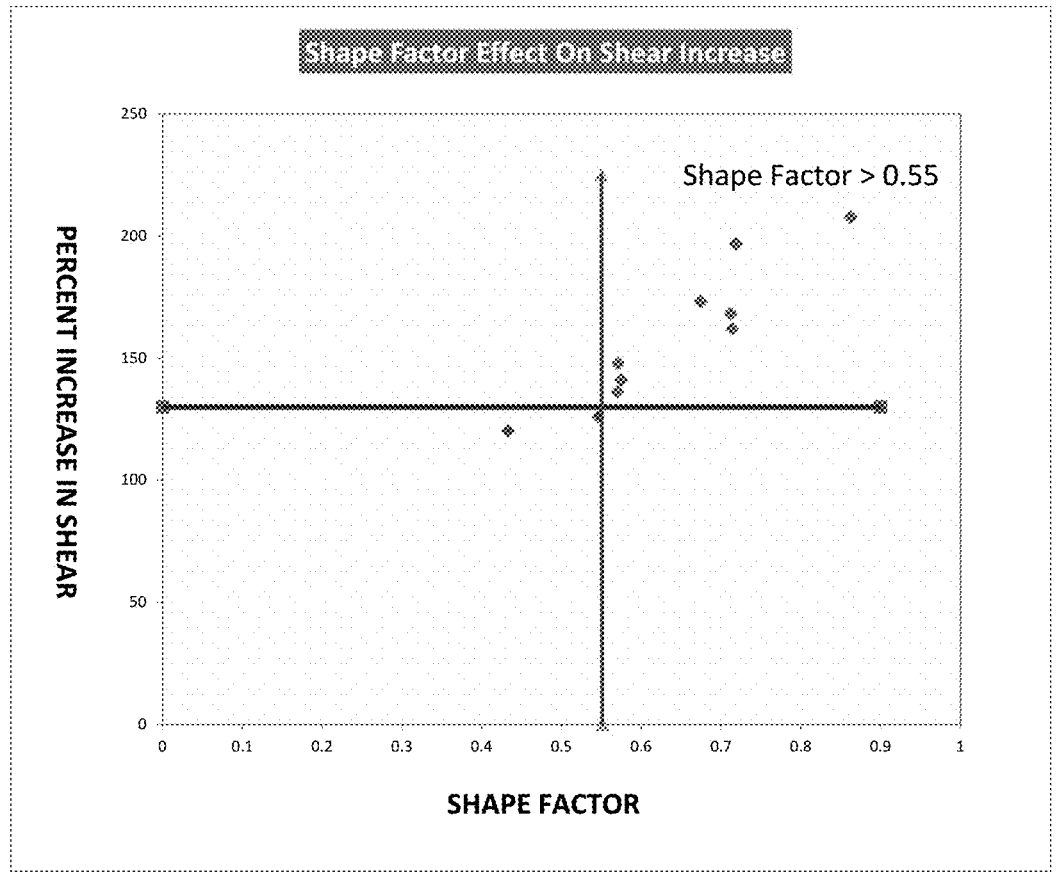
FIG. 6 is a graph of the table in FIG. 5.
Figure 8:
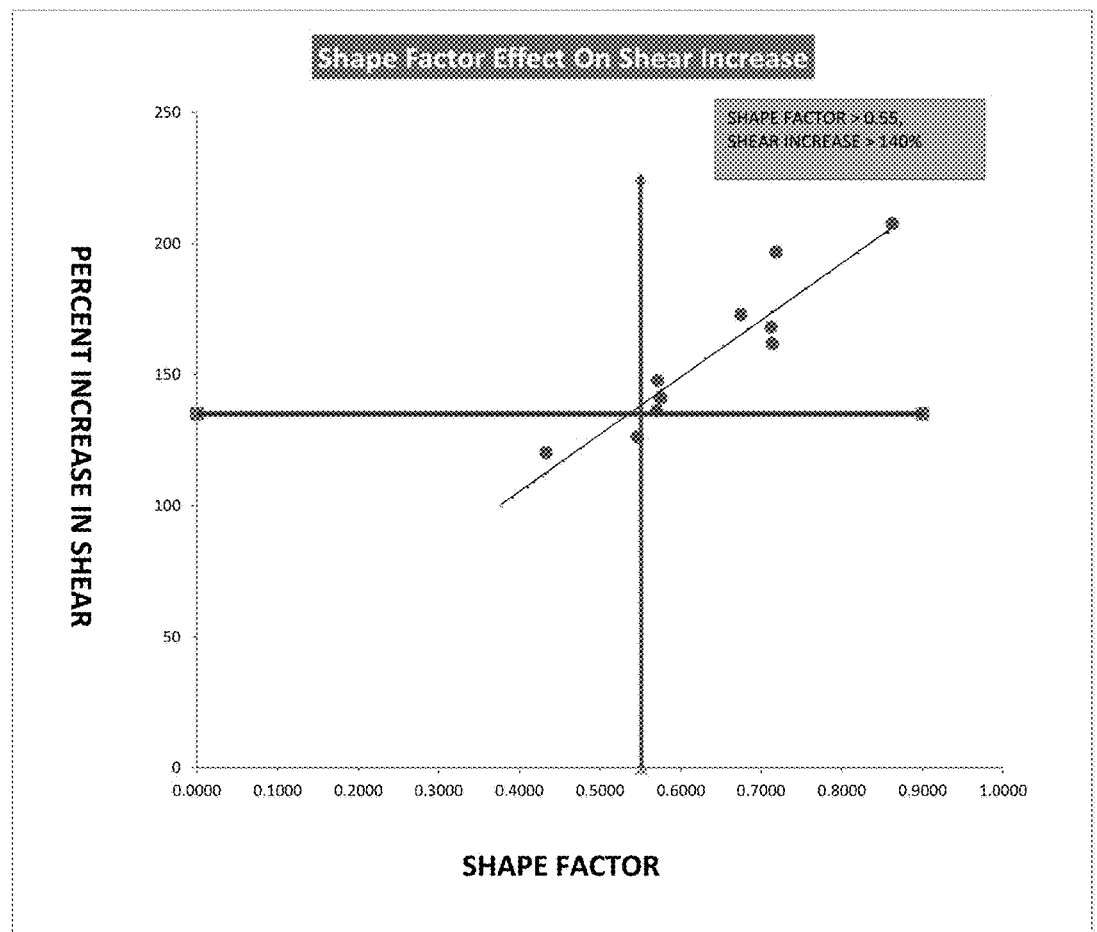
FIG. 8 is a graph of the table in FIG. 7 over-lapped with the graph of the table in FIG. 5.

FIG. 6 is a graph of the results shown in FIG. 5. Using the results from FIGS. 5 and 6, a prediction of the percentage increase can be calculated based on the shape factor. FIGS. 7 and 8 are a table and accompanying plot illustrating the percentage increase calculated for the shape factor and shear where shaded items are plotted giving an increase greater than 140 percent over prior designs and are a shape factor greater than 0.55. FIG. 7 shows predicted shear capacities calculated based on shape factor and FIG. 8 a plot between the shape factor and the percent shear increase based on predicted values.

The fastener provides a system which, when used in a system having a relatively thin material coupled to a relatively thick material, Type II failure mode is induced. Type II failure, as stated in AISI Manual, Cold-Formed Steel Design, occurs where a thicker material with a thickness t2 relative to a thin material t1 where t2/t1>=2.5, and results in bearing tearing, or piling up of the thinner material. In the present system, t2, is the thickness of the member not in contact with the screw and t1 is the thickness of the member in contact with screw head.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A fastener, comprising:
   a shank having a point at a first end and a second end defining a length, the shank including a first section and a second section, the second section including a plurality of threads and having a shank diameter, the second section adapted to engage a first steel element and a second steel element having a thickness greater than the first steel element,
   a head having an integral washer adapted to engage the first steel element, the washer having a washer diameter (d) and a thickness (t), wherein a shape factor of the washer describes a combined effect of the diameter and the thickness, wherein the shape factor for the thickness (t) greater than 0.06 inches is $d*(1+2.5t)*t^{(t-0.06)}$ and for the thickness (t) less than or equal to 0.06 inches is $d*(1+2.5t)*t^{(0.06-t)}$, and wherein the shape factor is greater than 0.55 to thereby provide improved shear resistance when attaching a first material having a thickness to a second material having a greater thickness.

2. The fastener of claim 1 wherein the first section includes a cutting tip.

3. The fastener of claim 2 wherein the thickness of the washer is between 0.1 inch and 0.05 inch.

4. The fastener of claim 3 wherein the thickness of the washer is 0.06 inch.

5. The fastener of claim 1 wherein the diameter of the washer is between 0.75 and 0.5 inch.

6. The fastener of claim 5 wherein the diameter of the washer is 0.625 inch.

7. A system, comprising:
a first steel element having a first thickness;
a second steel element having a second thickness greater than the first thickness; and
a fastener joining the first steel element to the second steel element, the fastener including a shank having a shank diameter and a head having an integral washer, the washer having a washer diameter (d) and a washer thickness (t), wherein a shape factor of the washer describes a combined effect of the diameter and the thickness, wherein the shape factor for the thickness (t) greater than 0.06 inches is $d*(1+2.5t)*t^{(t-0.06)}$ and for the thickness (t) less than or equal to 0.06 inches is $d*(1+2.5t)*t^{(0.06-t)}$, and wherein the shape factor is greater than 0.55 to thereby provide improved shear resistance when attaching a first material having a thickness to a second material having a greater thickness.

8. The fastener of claim 7 wherein the washer abuts the first steel element.

9. The fastener of claim 7 wherein the second thickness is at least two and half times the first thickness.

10. The fastener of claim 7 wherein the fastener includes a cutting tip at an end of the shank opposing the head.

11. The fastener of claim 10 wherein the washer thickness is between 0.1 inch and 0.05 inch.

12. The fastener of claim 11 wherein the washer thickness is 0.06 inch.

13. The fastener of claim 11 wherein the washer diameter is between 0.75 and 0.5 inch.

14. The fastener of claim 11 wherein the washer diameter is 0.625 inch.

15. A system, comprising:
a first steel element having a first thickness;
a second steel element having a second thickness at least two and half times the first thickness; and
a fastener joining the first steel element to the second steel element, the fastener including
a shank having a point at a first end defining a cutting point and a head at a second end defining a length, the shank including a first section and a second section, the second section having a shank diameter and a helical thread thereabout,
a head positioned adjacent to the helical thread having an integral washer, the washer having a washer diameter (d) and a thickness (t), wherein a shape factor of the washer describes a combined effect of the diameter (d) and the thickness (t), wherein the shape factor for the thickness (t) greater than 0.06 inches is $d*(1+2.5t)*t^{(t-0.06)}$ and for the thickness (t) less than or equal to 0.06 inches is $d*(1+2.5t)*t^{(0.06-t)}$, and wherein the shape factor is greater than 0.55 to thereby provide improved shear resistance when attaching the first steel element to the second steel element, and the washer abuts the first steel element.

16. The system of claim 15 wherein stress failure occurs under type II AISI bearing failure.

* * * * *